United States Patent [19]
Brainard, II

[11] Patent Number: 5,935,412
[45] Date of Patent: Aug. 10, 1999

[54] METHOD AND APPARATUS FOR ELIMINATING ODORS IN SEWAGE SYSTEMS

[75] Inventor: Edward C. Brainard, II, Marlon, Mass.

[73] Assignee: Atlantis Limited Partnership, Marion, Mass.

[21] Appl. No.: 08/877,512

[22] Filed: Jun. 17, 1997

[51] Int. Cl.⁶ ........................................... C02F 1/46
[52] U.S. Cl. .................. 205/687; 205/688; 205/745; 204/242; 204/271; 204/275
[58] Field of Search .................. 205/687, 688, 205/745, 494; 204/242, 271, 275

[56] References Cited

U.S. PATENT DOCUMENTS

| 3,806,435 | 4/1974 | Ohta . | |
|---|---|---|---|
| 4,008,775 | 2/1977 | Fox . | |
| 4,324,298 | 4/1982 | Fox . | |
| 4,525,254 | 6/1985 | Feofanov et al. | 205/745 |
| 4,749,457 | 6/1988 | Yasuda et al. | 205/745 |
| 4,880,510 | 11/1989 | Uhrich . | |
| 4,956,160 | 9/1990 | Reichert . | |
| 5,085,753 | 2/1992 | Sherman | 205/271 |
| 5,122,274 | 6/1992 | Heskett . | |
| 5,320,992 | 6/1994 | Fox et al. . | |

OTHER PUBLICATIONS

By Nigel Calder, *Boatowner's Mechanical and Electrical Manual*, Second Edition, p. 133, no date available.
"Wastewater Treatment Plant Odors and Control", *The National Environmental Journal*, Jan./Feb. 1995, pp. 28–31.

*Primary Examiner*—Arun S. Phasge
*Attorney, Agent, or Firm*—Young & Thompson

[57] ABSTRACT

A scrubber and method for precipitating a sulfide in water which contains hydrogen sulfide or a mercaptan. The scrubber includes a sacrificial first metal anode and a second metal cathode which are in physical and electrical contact and suspended into the water to form an electrolysis cell of the anode, cathode and the water. The second metal is more noble than the first metal. Preferably the anode is iron and the cathode is stainless steel. When so constituted, the anode forms iron oxide which reacts with sulfur from the hydrogen sulfide or the mercaptan to form an iron sulfide precipitate. The anode and cathode may be coplanar and suspended in the water with a free-moving float which facilitates contact of the water with the anode, or may be rods which are tethered and twisted to form a twisted wire pair.

10 Claims, 2 Drawing Sheets

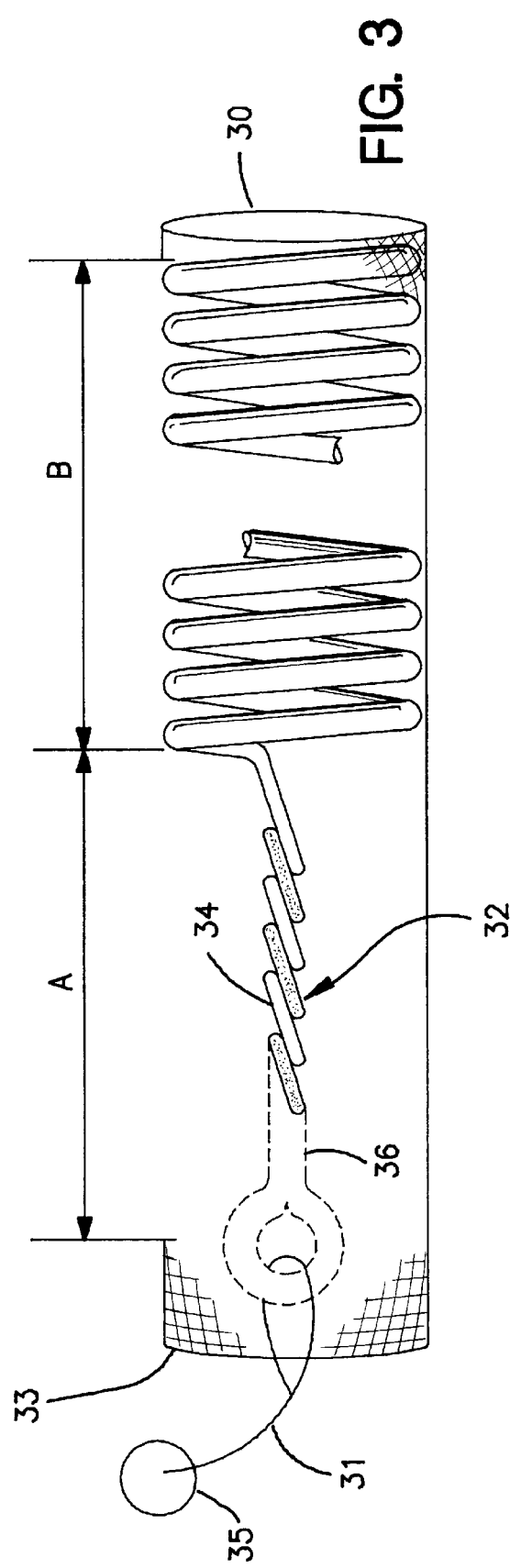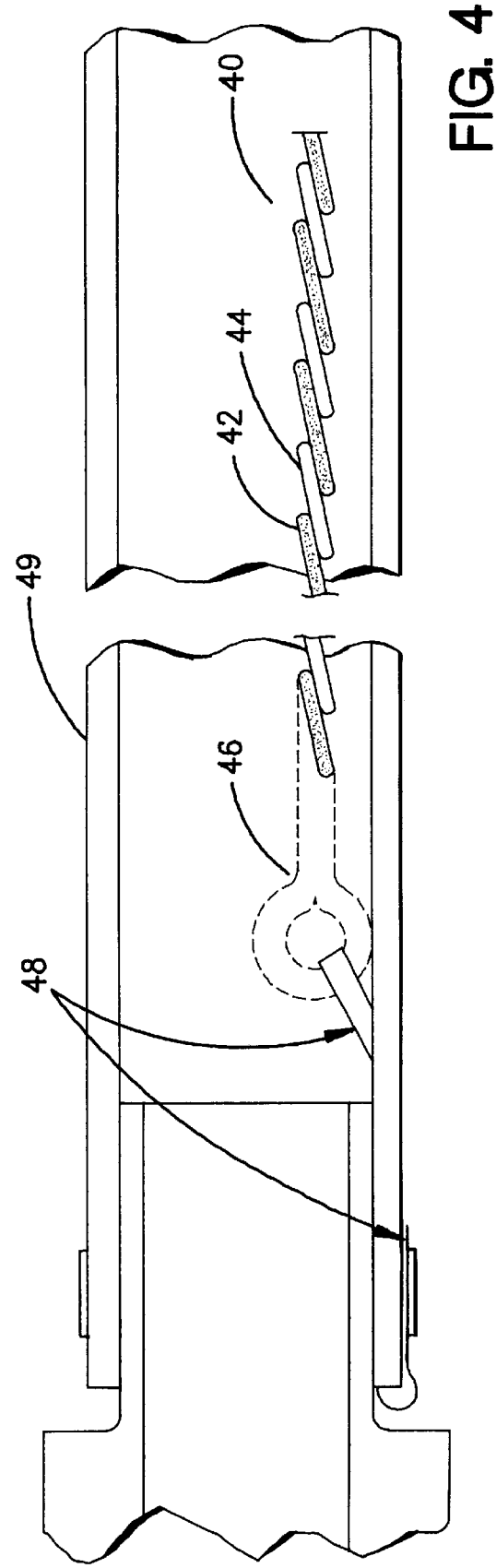

METHOD AND APPARATUS FOR ELIMINATING ODORS IN SEWAGE SYSTEMS

BACKGROUND OF THE PRESENT INVENTION

The present invention relates to odor scrubbers for sewage systems, and more particularly to a hydrogen sulfide/mercaptan scrubber adapted for a waste disposal tank and to a method of eliminating hydrogen sulfide and mercaptans from a waste disposal tank.

Disposal of waste can be a problem, especially for those who use a simple waste holding tank, such as typically found in a boat, recreational vehicle and domestic septic systems. Such tanks can produce disagreeable odors under anaerobic conditions. Hydrogen sulfide producing bacteria thrive under anaerobic conditions. The smell of the hydrogen sulfide can be detected at concentrations as low as 0.0011 mg/liter, is particularly obnoxious, and can make the confined interior space of a small vehicle less than a desirable place to be. Mercaptans (sulfur-containing compounds of the form RSH) also create a significant odor problem.

Various commercial waste disposal treatment systems which treat odors are available, but none has been found suitable for a simple waste holding tank, such as found in small pleasure boats, RVS, etc., due to cost, size, complexity, and the like. For example, some systems require a constant source of electrical power which is not found in most pleasure vehicles, or not used due to cost. Most pleasure vehicles have very limited power, and it is desirable that any odor treatment system function efficiently with no outside power source while the vehicle is unattended. Simpler odor treatments are also available, but most are additives which rely on one or more toxic chemicals which cannot be safely pumped into municipal systems. Further, it is desirable that the system require very low maintenance and avoid damage to other components of the waste disposal system.

Accordingly, it is an object of the present invention to provide a novel odor scrubber and method which is adaptable for simple waste holding tanks and obviates the problems of the prior art.

It is a further object of the present invention to provide a novel odor scrubber and method for precipitating a metal sulfide in water which contains hydrogen sulfide or a mercaptan in which the scrubber has a sacrificial first metal anode and cathode of a second metal more noble than the first metal which are suspended into the water to form an electrolysis cell in which the anode forms an oxide which reacts with sulfur from the hydrogen sulfide or mercaptan to form a sulfide precipitate.

It is yet a further object of the present invention to provide a novel odor scrubber for precipitating a metal sulfide in water which contains hydrogen sulfide or a mercaptan in which the scrubber has a sacrificial metal anode and stainless steel cathode which are suspended into the water to form an electrolysis cell, and in which the anode and cathode are coplanar and suspended in the water with a float which facilitates contact of the water with the anode.

It is still a further object of the present invention to provide a novel floating odor scrubber with a sacrificial metal anode and stainless steel cathode which are coplanar and suspended in the water with a float which may make the scrubber either positively buoyant, with the float on the water surface and the anode and cathode therebeneath, or neutrally buoyant, with the anode and cathode suspended with the float beneath the surface of the water.

It is another object of the present invention to provide a novel scrubber for precipitating a metal sulfide in a waste disposal tube which has standing water therein, the scrubber having a sacrificial anode which is a first metal rod and a cathode which is a second metal rod more noble than a first metal and in which the anode and the cathode are twisted to form a twisted wire pair in which the anode and cathode are in physical and electrical contact to form an electrolysis cell in which the wire pair has an external diameter not substantially greater than a total of diameters of the anode and cathode so as to be free of obstructions to waste disposed through the tube.

These and other objects and advantages of the present invention will be apparent to those of skill in the art from a perusal hereof.

BRIEF DESCRIPTION OF THE DRAWINGS

FIG. 3 is a pictorial representation of yet a further embodiment of the present invention with a coiled, twisted wire pair.

FIG. 4 is a cross-sectional side view of a further embodiment of the present invention with a twisted wire pair shown in a waste disposal tube.

DESCRIPTION OF PREFERRED EMBODIMENTS

An embodiment of a scrubber for precipitating a metal sulfide in water which contains hydrogen sulfide or a mercaptan may include a sacrificial anode of a first metal which is suspended into the water so as to be substantially surrounded thereby, and a cathode of a second metal more noble than the first metal (preferably stainless steel) which is also suspended into the water so as to be substantially surrounded thereby and is in physical and electrical contact with the anode to form an electrolysis cell comprised of the anode, the cathode and the water containing hydrogen sulfide or mercaptan. The first metal is preferably wrought or cast iron, but also may be manganese, cobalt, nickel, copper, zinc and the like, and alloys thereof. The metal which is used for the cathode may be any suitable metal or alloy which is more noble than the first metal and has a corrosion potential from −0.30 to −0.58 volts for a reference silver/silver chloride electrode. For example, the cathode may be one or more of stainless steel Types 410, 304, 303 or 316, Ni-Resist, and Inconel, although other suitable metals and alloys may be substituted without departing from the spirit of the present invention.

In operation, and without need for any outside source of energy, the anode, iron in this example, reacts with the water to form iron oxides (and possibly other species of iron compounds, depending on the water composition, temperature, pH, dissolved $O_2$, etc.) which react with sulfur from the hydrogen sulfide to form an iron sulfide precipitate which falls to the bottom of the tank. The sulfur previously available for combination with hydrogen is bound with the iron with a low solubility constant, and is no longer available for production of hydrogen sulfide, thereby removing the source of the odor. As will be discussed further below, the scrubber may be buoyant to allow free movement of the scrubber or may tethered in embodiments where free movement is not desired.

Figure 1:
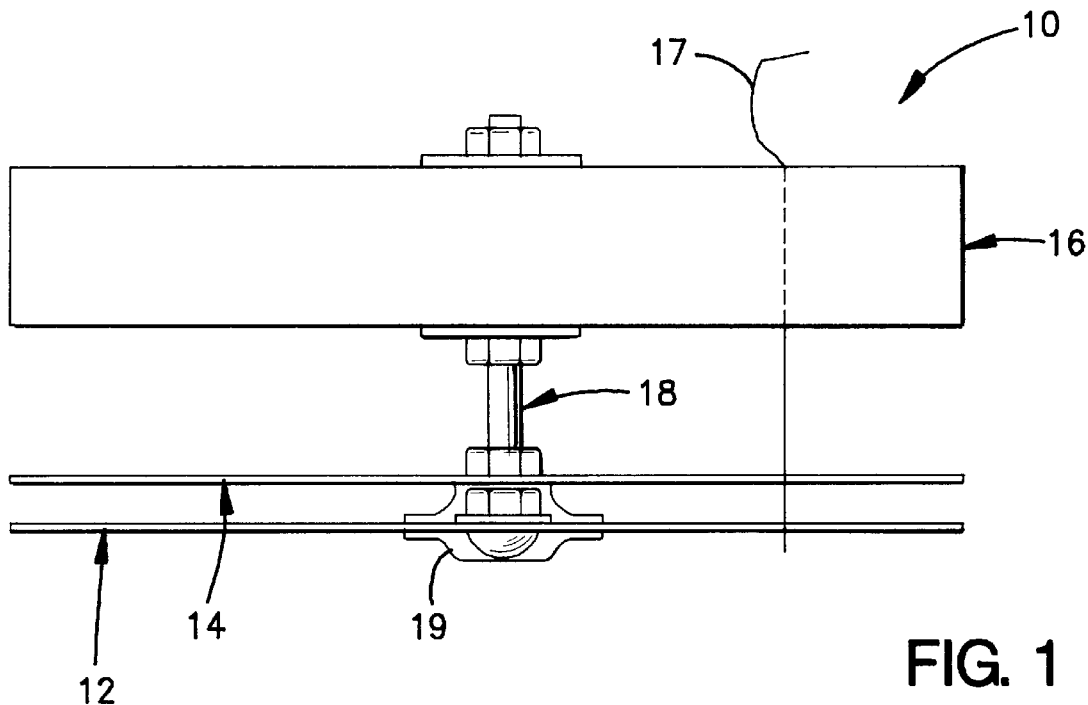
FIG. 1 is a side view of a first embodiment of the present invention with a positively buoyant float.

With reference now to FIG. 1, a scrubber 10 of a first embodiment may include an anode 12, a cathode 14 which may be planar (they are shown in side view in FIG. 1), and a float 16 for suspending anode 12 and cathode 14 in the water. Float 16 is preferably free-moving (that is, not in a fixed location) to facilitate relative movement between anode 12 and the water to promote the release of the anode metal over the surface of anode 12. A connective member 18 is used to provide a physical and an electrical connection between anode 12 and cathode 14. The anode and cathode are spaced apart a distance selected to control the rate of electrolysis.

In the embodiment of FIG. 1 float 16 renders scrubber 10 positively buoyant so that float 16 is at the water surface. Connective member 18 extends from float 16 into the water and is connected to central portions of anode 12 and cathode 14 so that anode 12 and cathode 14 are suspended generally horizontally with anode 12 beneath cathode 14. An epoxy seal 19 may be provided to control the rate of electrolysis in critical areas. A restraining tie 17 may be provided through holes in float 16, anode 12 and cathode 14 to ensure that the components do not separate and foul holding tank pump-out, and for retrieving scrubber 10.

The arrangement in which the anode is beneath the cathode (which is typically smaller and weighs less because it is not a sacrificial component) provides the added feature that scrubber 10 has increased righting stability. For example, where anode 12 is a six inch diameter iron disk 0.034 inches thick and cathode 14 is a six inch diameter stainless steel disk 0.025 inches thick spaced about one-quarter inch apart, and where cathode 14 is about one inch below a six inch diameter, one inch thick, 2 pound/ft$^3$, closed cell foam float 16, scrubber 10 is self-righting up to about 160 degrees.

Figure 2A:
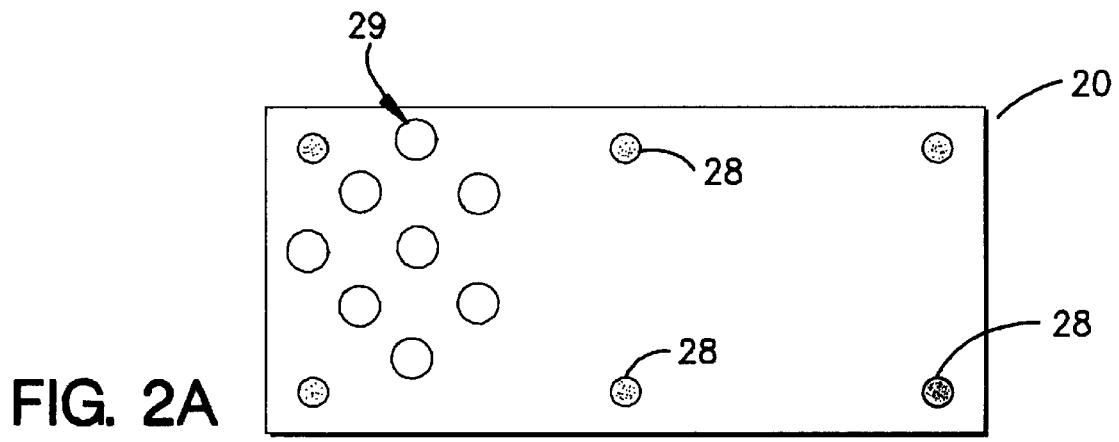
FIGS. 2a and 2b are top and side views of a further embodiment of the present invention.
Figure 2B:
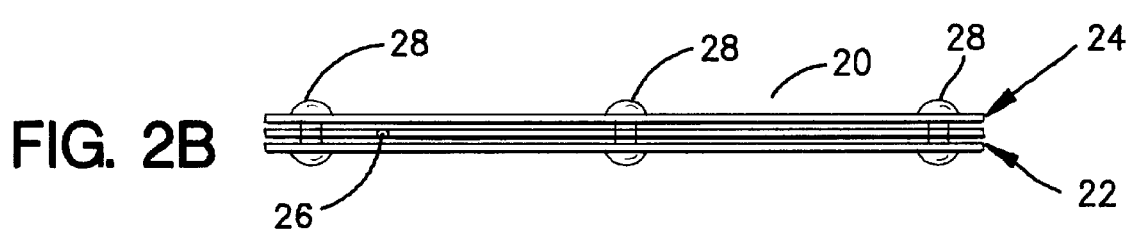

With reference now to FIGS. 2a and 2b, a scrubber 20 of a second embodiment may include an anode 22 and a cathode 24 which may be planar. Plural connective members 28 may be used to provide a physical and an electrical connection between anode 22 and cathode 24 and to keep them a fixed distance apart. The scrubber may be suspended vertically below a large float in a domestic septic system, or may lie on the floor of a flexible holding tank. Anode 22 and cathode 24 are less than an inch apart (about ¼ inch in a preferred embodiment) and may be provided with protective guards (not shown) at their corners and/or completely around the perimeter to protect a holding tank membrane from damage.

In a further embodiment, a float 26 for suspending anode 22 and cathode 24 may be provided. In contrast to the embodiment of FIG. 1, float 26 in the embodiment of FIG. 2 renders scrubber 20 neutrally buoyant so that scrubber 20 floats beneath the surface of the water. Neutral buoyancy may be difficult to achieve in systems where the scrubber may change weight due to accretion of falling waste material. Float 26 may be attached to several of connective members 28 to hold float 26 in place between anode 22 and cathode 24 while allowing space for water to circulate around anode 22 and cathode 24. Anode 22 may include a plurality of openings 29 for facilitating circulation of the water therearound.

With reference now to FIG. 3, a third embodiment 30 of the present invention may include an anode 32 and a cathode 34 which are both rods and which have been twisted together to form a twisted wire pair. In this embodiment the twisted wire pair is coiled to reduce the length of scrubber 30. For example, in FIG. 3 dimensions A and B may each be about one foot, with the coil having an outside diameter of about one and one-eighth inches (for insertion into a typical one and one-half inch hose for a holding tank). The original length of the twisted wire pair before being coiled was about 40 feet. The coiling increases the surface area of anode 32 and cathode 34 to promote removal of the sulfur while maintaining an overall size of scrubber 30 which is suitable for many marine holding tanks. The coiling further allows adjustment of the overall length of scrubber 30 so that the untethered end can reach to the bottom of the holding tank to increase exposure of the anode to water at all levels of the tank. (Note that the remainder of anode 32 is not shown in the coiled portion of the embodiment of FIG. 3 in the interest of clarity; both anode 32 and cathode 34 extend the full length of the twisted wire pair.)

A suitable tethering device, such as hook 36, may be provided to suspend scrubber 30 in the water containing hydrogen sulfide so that the twisted wire pair is submerged therein. Hook 36 may be an extension of cathode 34 or other suitable material. A lanyard 31, such as mylar, may be inserted through hook 36 and captured by a plug for the holding tank opening through which scrubber 30 was inserted.

An open-mesh sleeve 33 made of suitable non-metal material such as polyethylene may be provided as a cocoon for the anode and cathode. Sleeve 33 prevents pieces of the scrubber from separating and fouling the pump-out of the tank. Sleeve 33 also prevents the metal portions of the scrubber from contacting the interior of a metal tank. Contact with a stainless steel tank may accelerate electrolysis of the scrubber, and contact with an aluminum tank would accelerate electrolysis of the tank. Sleeve 33 may also be used to attach the lanyard 31. A ring 35 or similar device larger than the holding tank opening may be provided at the end of lanyard 31 to prevent inadvertent loss of the ability to retrieve the scrubber.

In an alternative embodiment of the scrubber with the open mesh sleeve, the anode and cathode may take any shape which need not be defined, such as metal scraps (not shown).

With reference now to FIG. 4, a fourth embodiment 40 of the present invention may include an anode 42 and a cathode 44 which are both rods and which have been twisted together to form a twisted wire pair. A suitable tethering device, such as hook 46 and leader 48 (for example, mylar tape) may be provided to suspend scrubber 40 in the water containing hydrogen sulfide so that the twisted pair is submerged therein. This embodiment is not coiled and is adapted for use in tubing 49 typically found between a pleasure craft's toilet and a siphon break. Scrubber 40 preferably has no protrusions or snags (or coils) so that waste routed through tubing 49 will not be caught. To this end, the external diameter of the twisted wire pair is preferably not substantially greater than that of anode 42 and cathode 44 together. Tubing 49 is filled with water even when the toilet is not in use, and thus the water in tubing 49 which contains sewage is in an anaerobic condition since no oxygen can enter the water. The hydrogen sulfide gas seeps through the tubing wall or out the tubing vent (not shown). Placement of scrubber 40 in tubing 49 assures that the sulfur will not be available for odor formation.

It is to be noted further that the present invention is applicable to salt and fresh water as it is the hydrogen sulfide which produces the electrolysis cell action.

While preferred embodiments of the present invention have been described, it is to be understood that the invention is to be defined by the appended claims when read in light of the specification and accorded their full range of equivalence, with changes and modifications being apparent to those of skill in the art.

What is claimed is:

1. A scrubber for precipitating a sulfide in water which contains hydrogen sulfide or mercaptans, the scrubber comprising:

a sacrificial anode comprising a first metal wire rod, which is suspended into the water containing hydrogen sulfide or mercaptans so as to be substantially surrounded thereby;

a cathode comprising a second metal wire rod more noble than said first metal that is twisted together with said first metal wire rod into continuous physical and electrical contact with said first metal wire rod to form a twisted wire pair, said cathode being suspended into the water so as to be substantially surrounded thereby and physically contacting said anode to be electrically connected thereto to form an electrolysis cell comprised of said anode, said cathode and the water containing hydrogen sulfide or mercaptans, wherein said anode forms a first metal oxide which reacts with sulfur from the hydrogen sulfide or the mercaptans to form a first metal sulfide precipitate; and a nonmetal sleeve with an open mesh surrounding said twisted wire pair.

2. The scrubber of claim 1 wherein said first metal comprises iron and said second metal comprises a metal or alloy having a corrosion potential from −0.30 to −0.58 volts for a reference silver/silver chloride electrode.

3. The floating scrubber of claim 2, wherein said second metal comprises one of stainless steel Types 410, 304, 303 or 316, Ni-Resist, and Inconel.

4. The scrubber of claim 1, wherein said twisted wire pair is coiled along a substantial portion of its length.

5. A scrubber for precipitating a sulfide in a waste disposal tube which has standing water therein which includes hydrogen sulfide or a mercaptan, the scrubber comprising:

a sacrificial anode comprising a first metal rod which is suspended into the tube so as to be substantially surrounded by the standing water containing hydrogen sulfide or a mercaptan;

a cathode comprising a second metal rod more noble than said first metal, said cathode being suspended into the tube so as to be substantially surrounded by the standing water;

said anode and said cathode being twisted to form a twisted wire pair in which said anode and said cathode are in continuous physical and electrical contact to form an electrolysis cell comprised of said anode, said cathode and the standing water, said twisted wire pair having an external diameter not substantially greater than a total of diameters of said anode and said cathode so as to be free of obstructions to waste disposed through the tube; and means for suspending said twisted wire pair from a first end of the tube into which waste is received, wherein said anode forms an oxide of the first metal which reacts with sulfur from the hydrogen sulfide or the mercaptan to form a first metal sulfide which precipitates out a second end of the tube through which waste is disposed.

6. The scrubber of claim 5 wherein said means for suspending comprises a loop of said second metal extending from said twisted wire pair and a mylar leader through said loop.

7. The scrubber of claim 5, further comprising a plastic open-mesh sleeve encasing said twisted wire pair.

8. The scrubber of claim 7, wherein said means for suspending is attached to said sleeve.

9. A method of precipitating a sulfide in water which contains hydrogen sulfide or a mercaptan, the method comprising the steps of:

twisting a sacrificial anode of a first metal and a cathode of a second metal more noble than the first metal together to form a twisted wire pair in which the anode and cathode are in continuous physical and electrical contact;

tethering the twisted wire pair to a container for the water;

continuously suspending the tethered twisted wire pair into the water containing hydrogen sulfide or the mercaptan so as to be continuously and substantially surrounded thereby;

the anode and the cathode forming an electrolysis cell with the water, wherein the anode forms a first metal oxide which reacts with sulfur from the hydrogen sulfide or the mercaptan to form a first metal sulfide precipitate.

10. The method of claim 9, further comprising the step of encasing the twisted wire pair in a plastic open-mesh sleeve.

\* \* \* \* \*